(12) United States Patent
Nishida

(10) Patent No.: US 10,746,127 B2
(45) Date of Patent: Aug. 18, 2020

(54) CONTROLLER AND CONTROL METHOD FOR INTERNAL COMBUSTION ENGINE

(71) Applicant: TOYOTA JIDOSHA KABUSHIKI KAISHA, Aichi-ken (JP)

(72) Inventor: Kentaro Nishida, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 16/544,912

(22) Filed: Aug. 20, 2019

(65) Prior Publication Data

US 2020/0072155 A1    Mar. 5, 2020

(30) Foreign Application Priority Data

Aug. 29, 2018  (JP) ................................. 2018-160277

(51) Int. Cl.
*F02D 41/40* (2006.01)
*F02D 41/30* (2006.01)
*F02M 59/36* (2006.01)

(52) U.S. Cl.
CPC ....... *F02D 41/403* (2013.01); *F02D 41/3035* (2013.01); *F02D 41/3047* (2013.01); *F02M 59/36* (2013.01); *F02D 2200/021* (2013.01); *F02D 2200/0602* (2013.01); *F02D 2200/0611* (2013.01); *F02D 2200/0612* (2013.01)

(58) Field of Classification Search
CPC ............... F02D 41/3047; F02D 41/403; F02D 2200/021; F02D 2200/0602; F02D 2200/0611; F02D 2200/0612

USPC .......................................... 123/299; 701/105
See application file for complete search history.

(56) References Cited

U.S. PATENT DOCUMENTS

| | | | | |
|---|---|---|---|---|
| 6,276,334 B1 * | 8/2001 | Flynn | ...................... | F02B 19/14 123/435 |
| 2008/0262699 A1 * | 10/2008 | Hasegawa | .............. | F02M 26/07 701/103 |
| 2011/0088657 A1 * | 4/2011 | Tanno | ................... | F02D 19/081 123/305 |
| 2011/0132318 A1 | 6/2011 | Rayl et al. | | |
| 2015/0330326 A1 | 11/2015 | Shaver et al. | | |
| 2018/0195457 A1 | 7/2018 | Negami et al. | | |

FOREIGN PATENT DOCUMENTS

| | | | |
|---|---|---|---|
| EP | 2075442 A1 | 7/2009 | |
| EP | 2778377 A1 | 9/2014 | |
| JP | 2007-285195 A | 11/2007 | |
| JP | 2008-121641 A | 5/2008 | |

(Continued)

Primary Examiner — Erick R Solis
(74) Attorney, Agent, or Firm — Hauptman Ham, LLP

(57) ABSTRACT

A controller includes a valve control unit and a target calculation unit. The valve control unit is configured to control a fuel injection valve such that divergence decreases between an ignition delay of fuel injected into a cylinder through main injection and an ignition delay target value. The target calculation unit is configured to calculate the ignition delay target value such that the ignition delay target value decreases as estimated ignitability of the fuel in the cylinder increases during an engine operation in a region where diffusion combustion and premix combustion are both performed, the ignitability of the fuel in the cylinder being estimated based on a parameter that varies the ignitability.

8 Claims, 4 Drawing Sheets

(56) References Cited

FOREIGN PATENT DOCUMENTS

| | | |
|---|---|---|
| JP | 2008-169714 A | 7/2008 |
| JP | 2015-137543 A | 7/2015 |
| WO | 2013/051109 A1 | 4/2013 |
| WO | 2014/093643 A1 | 6/2014 |

* cited by examiner

CONTROLLER AND CONTROL METHOD FOR INTERNAL COMBUSTION ENGINE

RELATED APPLICATIONS

The present application claims priority of Japanese Application Number 2018-160277, filed on Aug. 29, 2018, the disclosure of which is hereby incorporated by reference herein in its entirety.

1. FIELD

The present disclosure relates to a controller and a control method for an internal combustion engine configured to control a compression ignition internal combustion engine.

2. DESCRIPTION OF RELATED ART

International Publication No. 2013/051109 discloses an example of a combustion engine for an internal combustion engine. In the internal combustion engine, the controller causes a fuel injection valve to perform pilot injection before the piston reaches the compression top dead center and then causes the fuel injection valve to perform main injection when the piston reaches the vicinity of the compression top dead center. When fuel is injected into the cylinder through the pilot injection, premixed combustion is performed in the cylinder, thereby increasing the temperature in the cylinder. When the main injection is performed in a state in which the temperature in the cylinder is sufficiently high, diffusion combustion is performed in the cylinder.

The above-described controller estimates an ignition delay, which is the length of a period from a point in time at which the fuel injection valve starts injecting fuel to a point in time at which the combustion of the fuel is started. Further, a predetermined calculation equation including engine rotation speed and engine load ratio as variables is used to obtain an ignition delay target value, which is a target of the ignition delay. Then, the open degrees of nozzle vanes of a forced-induction device are adjusted such that the ignition delay becomes the ignition delay target value.

Increases in the open degrees of the nozzle vanes of the forced-induction device reduce the boost pressure of the forced-induction device. When the boost pressure is reduced, the ignition delay is lengthened.

Thus, the above-described controller increases the open degrees of the nozzle vanes when the ignition delay is shorter than the ignition delay target value. By contrast, the controller decreases the open degrees of the nozzle vanes when the ignition delay is longer than the ignition delay target value.

During the engine operation, combustion noise, which is the noise generated due to combustion in the cylinder, is produced. In some cases, during the engine operation in a region where the diffusion combustion and the premixed combustion are both performed, the level of combustion noise varies even if the boost pressure is adjusted to keep the ignition delay equal to the ignition delay target value.

In the region where the diffusion combustion and the premixed combustion are both performed, even if the premixed combustion is started prior to the diffusion combustion, the diffusion combustion is started while the premixed combustion is still being performed.

SUMMARY

A first aspect provides a controller for an internal combustion engine. The controller is configured to control a compression self-ignition internal combustion engine including a fuel injection valve that injects fuel into a cylinder and cause the fuel injection valve to perform main injection after causing the fuel injection valve to perform pilot injection. The controller includes a valve control unit and a target calculation unit. The valve control unit is configured to control the fuel injection valve such that divergence decreases between an ignition delay of the fuel injected into the cylinder through the main injection and an ignition delay target value, the ignition delay target value being a target of the ignition delay. The target calculation unit is configured to calculate the ignition delay target value such that the ignition delay target value decreases as ignitability of the fuel in the cylinder increases during an engine operation in a region where diffusion combustion and premix combustion are both performed, the ignitability of the fuel in the cylinder being estimated based on a parameter that varies the ignitability.

It is known that the combustion noise, which is the noise resulting from the combustion of fuel in the cylinder, increases as the premixed combustion speed increases.

By executing various experiments and simulations, the inventor has found that the premixed combustion speed decreases as the ignitability of fuel in the cylinder decreases.

According to conventional findings and the inventor's new findings, the premixed combustion speed decreases as the ignitability of fuel in the cylinder decreases, thereby increasing the combustion noise.

The inventor has also found that during the engine operation in the region where the diffusion combustion and the premixed combustion are both performed, the proportion of the premixed combustion in the diffusion combustion and the premixed combustion increases as the ignition delay of fuel in the cylinder increases, thereby increasing the combustion noise.

Thus, in the above-described configuration, the ignition delay target value of fuel injected into the cylinder through the main injection is calculated based on the ignitability of fuel in the cylinder, which is estimated based on the parameters that vary the ignitability of fuel in the cylinder. That is, the ignition delay target value is calculated such that the ignition delay target value decreases as the estimated ignitability of fuel in the cylinder increases. The fuel injection valve is controlled such that divergence decreases between the ignition delay of the fuel injected into the cylinder through the main injection and the ignition delay target value.

As described above, as the ignitability of fuel increases, the premixed combustion speed increases and the combustion noise tends to increase. In the above-described configuration, the ignition delay target value decreases as the ignitability of fuel increases. Thus, even if the ignitability of fuel increases, an increase in the proportion of the premixed combustion in the diffusion combustion and the premixed combustion can be limited by reducing the ignition delay target value. That is, even if the ignitability of fuel increases, an increase in combustion noise can be limited. This limits a change in the level of combustion noise resulting from a change in the premixed combustion speed, that is, a change in the ignitability. Thus, when the engine operation state is kept at a certain state, a change in the level of combustion noise can be limited even if a change occurs in the parameters that vary the ignitability of fuel in the cylinder.

Thus, the above-described configuration limits the variation in the level of combustion noise during the engine operation in the region where the diffusion combustion and the premixed combustion are both performed.

As the fuel partial pressure in the cylinder increases, the ignitability of fuel in the cylinder tends to increase. That is, the fuel partial pressure in the cylinder is one example of the above-described parameters. Thus, the target calculation unit may be configured to estimate the ignitability of the fuel in the cylinder such that the ignitability increases as the fuel partial pressure in the cylinder increases.

Also, as the oxygen partial pressure in the cylinder increases, the ignitability of fuel in the cylinder tends to increase. That is, the oxygen partial pressure in the cylinder is one example of the above-described parameters. Thus, the target calculation unit may be configured to estimate the ignitability of the fuel in the cylinder such that the ignitability increases as the oxygen partial pressure in the cylinder increases.

Also, as the temperature in the cylinder increases, the ignitability of fuel in the cylinder tends to increase. That is, the temperature in the cylinder is one example of the above-described parameters. Thus, the target calculation unit may be configured to estimate the ignitability of the fuel in the cylinder such that the ignitability increases as the temperature in the cylinder increases.

The controller for the internal combustion engine may include an index calculation unit that calculates an index of the ignitability of the fuel based on the fuel partial pressure in the cylinder, the oxygen partial pressure in the cylinder, and the temperature in the cylinder. In this case, it is preferred that the target calculation unit be configured to calculate the ignition delay target value based on the index calculated by the index calculation unit.

$\tau 0$ is the index, Pfuel is the fuel partial pressure in the cylinder, O2 is the oxygen partial pressure in the cylinder, T is the temperature in the cylinder, M(T) is a function that includes the temperature in the cylinder as a variable, and A, B, and C are model constants. Using, for example, the following equation, the index calculation unit can calculate the above-described index on which the parameters are reflected. The index calculated in this manner is the length of the ignition delay of fuel when a single injection is performed. The index decreases as the ignitability of fuel increases. Calculating the ignition delay target value based on the index allows the ignition delay target value to decrease as the ignitability of fuel increases.

$$\tau 0 = \frac{1}{A \cdot [Pfuel]^B \cdot [O2]^C \cdot M(T)}$$

A decrease in the fuel injection amount of the pilot injection lengthens the ignition delay of fuel injected into the cylinder through the main injection. Thus, the valve control unit may be configured to approximate the ignition delay of fuel injected into the cylinder through the main injection to the ignition delay target value by adjusting the fuel injection amount of the pilot injection.

The ignition delay of fuel injected into the cylinder through the main injection can be lengthened by retarding the start point in time of the pilot injection, that is, by adjusting the start point in time of the pilot injection. Thus, the valve control unit may be configured to approximate the ignition delay of fuel injected into the cylinder through the main injection to the ignition delay target value by adjusting the start point in time of the pilot injection.

A second aspect provides a method for controlling an internal combustion engine. The controller controls a compression ignition internal combustion engine including a fuel injection valve that injects fuel into a cylinder. The method includes performing pilot injection with the fuel injection valve, performing main injection after the pilot injection, controlling the fuel injection valve such that divergence decreases between an ignition delay of the fuel injected into the cylinder through the main injection and an ignition delay target value, the ignition delay target value being a target of the ignition delay, and calculating the ignition delay target value such that the ignition delay target value decreases as ignitability of the fuel in the cylinder increases during an engine operation in a region where diffusion combustion and premix combustion are both performed, the ignitability of the fuel in the cylinder being estimated based on a parameter that varies the ignitability.

A third aspect provides a controller for an internal combustion engine. The controller is configured to control a compression ignition internal combustion engine including a fuel injection valve that injects fuel into a cylinder and configured to cause the fuel injection valve to perform pilot injection and then perform main injection. The controller includes processing circuitry configured to perform a process for controlling the fuel injection valve such that divergence decreases between an ignition delay of the fuel injected into the cylinder through the main injection and an ignition delay target value, the ignition delay target value being a target of the ignition delay and a process for calculating the ignition delay target value such that the ignition delay target value decreases as ignitability of the fuel in the cylinder increases during an engine operation in a region where diffusion combustion and premix combustion are both performed, the ignitability of the fuel in the cylinder being estimated based on a parameter that varies the ignitability.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A controller 60 for an internal combustion engine 10 according to an embodiment will now be described with reference to FIGS. 1 to 7.

Figure 1:
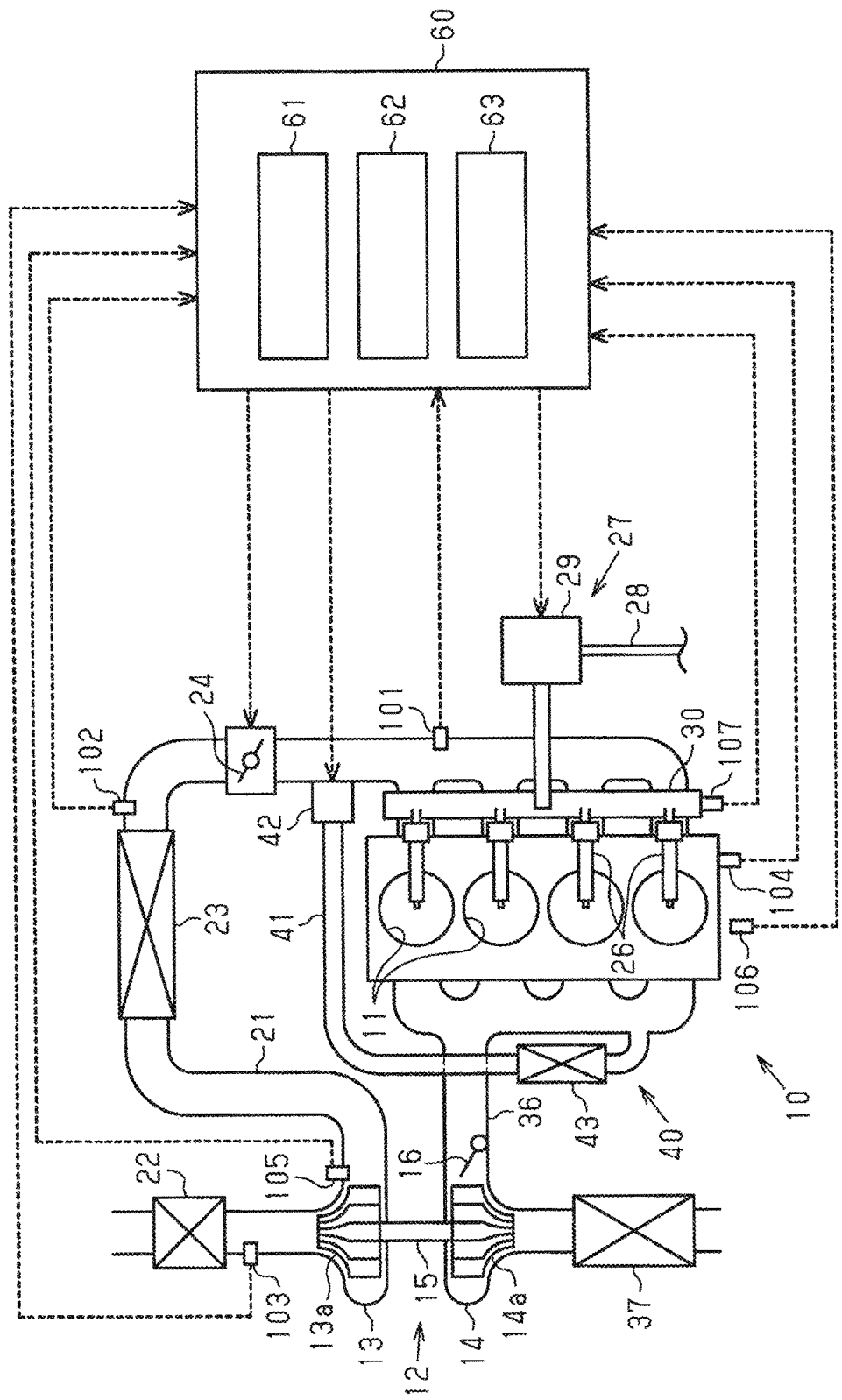
FIG. 1 is a schematic diagram showing the configuration of a controller for an internal combustion engine according to an embodiment and the configuration of the internal combustion engine controlled by the controller.

FIG. 1 shows the controller 60 of the present embodiment and the internal combustion engine 10, which is controlled by the controller 60. The controller 60 includes processing circuitry. The internal combustion engine 10 is a compression ignition internal combustion engine. The internal combustion engine 10 includes cylinders 11 and an exhaust-driven forced-induction device 12. The internal combustion engine 10 includes an intake passage 21. The intake passage 21 includes, in order from the upstream end in the flow direction of air, an air cleaner 22, a compressor 13 for the forced-induction device 12, an intercooler 23, and a throttle valve 24. In the intake passage 21, air filtered by the air cleaner 22 is delivered in a state of being compressed by a compressor wheel 13a, which is incorporated in the compressor 13. The air compressed in this manner is cooled by the intercooler 23. An intake air amount, which is the amount of air introduced into the cylinders 11 through the intake passage 21, is adjusted by controlling the open degree of the throttle valve 24.

The internal combustion engine 10 includes fuel injection valves 26. The number of the fuel injection valves 26 is the same as that of the cylinders 11. Each fuel injection valve 26 directly injects fuel into the corresponding cylinder 11. Each fuel injection valve 26 is supplied with fuel from a fuel supply device 27. The fuel supply device 27 includes a supply pump 29 and a common rail 30. The supply pump 29 is used to pump fuel stored in the fuel tank through the supply passage 28. The fuel pressurized by the supply pump 29 is temporarily stored in the common rail 30. The fuel in the common rail 30 is supplied to each fuel injection valve 26. When the fuel is injected from the fuel injection valves 26 into the cylinders 11, the fuel is exposed to the compressed air and burns.

The exhaust gas generated through the combustion of the fuel in the cylinders 11 are discharged to the exhaust passage 36. The exhaust passage 36 includes, in order from the upstream end in the flow direction of exhaust gas, a turbine 14 for the forced-induction device 12 and an exhaust removal device 37. The exhaust removal device 37 captures particulate matter in exhaust gas to remove the exhaust gas.

The turbine 14 is equipped with a turbine wheel 14a. The turbine wheel 14a is coupled to the compressor wheel 13a by a coupling shaft 15. Thus, when the turbine wheel 14a is rotated by the momentum of flow of exhaust gas, the compressor wheel 13a is rotated in synchronization with the rotation of the turbine wheel 14a. As a result, the compressor 13 pressurizes air. The turbine 14 includes an exhaust gas blowing port for the turbine wheel 14a. This port is provided with a variable nozzle 16, which varies the opening area of the exhaust gas blowing port depending on a change in the nozzle open degree. Adjusting the nozzle open degree of the variable nozzle 16 adjusts the flow rate of exhaust gas blown against the turbine wheel 14a.

The internal combustion engine 10 includes an EGR device 40, which causes some of exhaust gas flowing through the exhaust passage 36 to recirculate through the intake passage 21 as EGR gas. The EGR device 40 includes an EGR passage 41, which causes exhaust gas to be taken out of a portion of the exhaust passage 36 located upstream of the turbine 14, and an EGR flow rate adjustment device 42, which adjusts the flow rate of EGR gas through the EGR passage 41 toward the intake passage 21. The EGR passage 41 connects a portion of the intake passage 21 located downstream of the throttle valve 24 to a portion of the exhaust passage 36 located upstream of the turbine 14. The EGR passage 41 is provided with an EGR cooler 43, which cools EGR gas flowing through the EGR passage 41. When the valve of the EGR flow rate adjustment device 42 is open, the EGR gas that has flowed from the exhaust passage 36 into the EGR passage 41 is cooled by the EGR cooler 43 and then introduced into the intake passage 21 through the EGR flow rate adjustment device 42.

The controller 60 receives signals from various types of sensors such as an intake pressure sensor 101, an intake temperature sensor 102, an air flow meter 103, a water temperature sensor 104, a boost pressure sensor 105, a crank angle sensor 106, and a fuel pressure sensor 107.

The intake pressure sensor 101 detects an intake pressure Pim, which is the pressure of air flowing at a section of the intake passage 21 located downstream of the throttle valve 24, and outputs a signal corresponding to the detected intake pressure Pim. The intake temperature sensor 102 detects an intake temperature Thim, which is the temperature of air flowing at a section of the intake passage 21 located downstream of the intercooler 23, and outputs a signal corresponding to the detected intake temperature Thim. The air flow meter 103 detects an intake air amount GA, which is the flow rate of air flowing at a section of the intake passage 21 located upstream of the compressor 13, and outputs a signal corresponding to the detected intake air amount GA. The water temperature sensor 104 detects a water temperature Thw, which is the temperature of engine coolant flowing through the cylinder block of the internal combustion engine 10, and outputs a signal corresponding to the detected water temperature Thw. The boost pressure sensor 105 detects a boost pressure BP of the forced-induction device 12 and outputs a signal corresponding to the detected boost pressure BP. The boost pressure sensor 105 detects a gauge pressure as the boost pressure BP. The reference of the gauge pressure is the atmospheric pressure. The crank angle sensor 106 detects an engine rotation speed NE, which is the rotation speed of an output shaft of the internal combustion engine 10, and outputs a signal corresponding to the detected engine rotation speed NE. The fuel pressure sensor 107 detects a common rail pressure Pcr, which is the pressure of fuel in the common rail 30, and outputs a signal corresponding to the detected common rail pressure Pcr.

The controller 60 controls the engine operation based on the output signals of the sensors 101 to 107.

The controller 60 includes a valve control unit 61, an index calculation unit 62, and a target calculation unit 63 as functional units.

The valve control unit 61 controls the driving of the fuel injection valve 26. More specifically, when causing fuel to burn in the cylinder 11, the valve control unit 61 causes the fuel injection valve 26 to perform pilot injection and main injection. The pilot injection is fuel injection performed before the pistons moving back and forth in respective cylinders 11 reach the compression top dead center. The main injection is fuel injection performed after the pilot injection and performed before the pistons reach the vicinity of the compression top dead center. When fuel is injected into the cylinder 11 through the pilot injection, premixed combustion is performed in the cylinder 11, thereby increasing the temperatures in the cylinder 11. With the temperatures in the cylinders 11 increased in such a manner, the main injection is performed. As a result, diffusion combustion is performed in the cylinder 11. In some cases, the diffusion combustion is started in a state in which the premixed combustion, which has been started earlier, is still being performed. The region where the diffusion combustion is started in a state in which the premixed combustion is still being performed is referred to as a region where the premixed combustion and the diffusion combustion are both performed.

When the engine operation is performed in the region where the premixed combustion and the diffusion combustion are both performed, the valve control unit 61 controls the fuel injection valve 26 to approximate an ignition delay τ of fuel injected into the cylinder 11 through the main injection to an ignition delay target value τtrg. The ignition delay τ is the length of a period from a point in time at which the fuel injection valve 26 starts injecting fuel to a point in time at which the combustion of the fuel is started. The ignition delay target value τtrg is a target of the ignition delay.

The index calculation unit 62 is configured to calculate an index τ0 of the ignitability of fuel in the cylinder 11 based on parameters that vary the ignitability of the fuel in the cylinder 11. The ignitability of fuel refers to how easily fuel is ignited. The index τ0 calculated by the index calculation unit 62 is the length of time of the ignition delay of fuel when the index calculation unit 62 causes the fuel injection valve 26 to perform single injection. The index τ0 decreases as the ignitability of fuel in the cylinder 11 increases.

The parameters that vary the ignitability of fuel in the cylinder 11 include, for example, the intake temperature Thim, the intake pressure Pim, the recirculation amount of EGR gas, the boost pressure BP, the water temperature Thw, which is the temperature of engine coolant, an outside air temperature, and an outside atmospheric pressure.

For example, the index calculation unit 62 calculates the index τ0 using the following Arrhenius equation (1). In equation (1), Pfuel is a fuel partial pressure in the cylinder 11 at the point in time the main injection ends, O2 is an oxygen partial pressure in the cylinder 11 at the point in time the main injection ends, and T is the temperature in the cylinder 11 at the point in time the main injection starts. M(T) is a function that includes the temperature T in the cylinder 11 as a variable. That is, the function M(T) allows a larger value to be obtained as the temperature T in the cylinder 11 becomes higher. For example, the exponential function of the following equation (2) can be used for the function M(T). In this case, a model constant D is set such that the calculation result of equation (2) becomes larger as the temperature T in the cylinder 11 becomes higher. For example, the model constant D is set to a negative value. Further, A, B, and C in equation (1) are model constants that have been set in advance through experiments and simulations. More specifically, the model constant B is set such that the index τ0 decreases as the fuel partial pressure Pfuel increases. The model constant C is set such that the index τ0 decreases as the oxygen partial pressure O2 increases. For example, the model constants B and C are set to positive values. The model constant A is set such that the index τ0 decreases as the product of the B-th power of the fuel partial pressure Pfuel, the C-th power of the oxygen partial pressure O2, and the M(T). For example, the model constant A is set to a positive value.

$$\tau 0 = \frac{1}{A \cdot [Pfuel]^B \cdot [O2]^C \cdot M(T)} \quad (1)$$

$$M(T) = \exp\left(\frac{D}{T}\right) \quad (2)$$

The fuel partial pressure Pfuel is calculated as the product of a fuel concentration Cfuel in the cylinder 11 and an in-cylinder pressure Pcy, which is the pressure in the cylinder 11. The fuel concentration Cfuel is a value corresponding to a spray equivalence ratio Φ at a point in time at which the main injection ends. The spray equivalence ratio Φ at the point in time at which the main injection ends is calculated based on a command value of the injection amount when the fuel injection valve 26 is caused to perform the main injection.

The spray equivalence ratio Φ is the equivalence ratio in the spray of fuel injected from the fuel injection valve 26 into the cylinder 11. For example, the spray equivalence ratio Φ can be obtained by dividing the stoichiometric air-fuel ratio by a spray air-fuel ratio. The spray air-fuel ratio is the air-fuel ratio in the spray of fuel injected from the fuel injection valve 26 into the cylinder 11. The spray air-fuel ratio can be obtained by dividing the amount of air in the spray by the amount of fuel in the spray. The amount of air in the spray is calculated based on a volume V of spray at the point in time at which the main injection ends and an oxygen concentration Cox in the cylinder 11.

Figure 2:
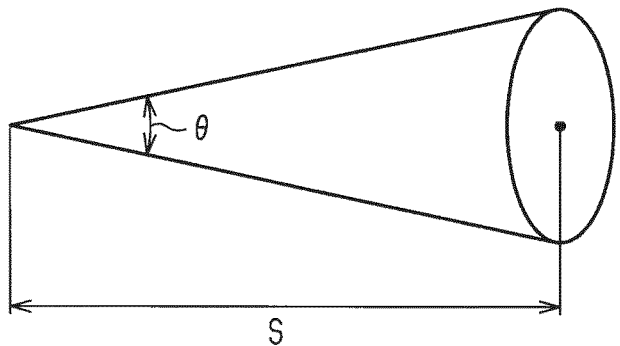
FIG. 2 is a diagram modeling the spray of fuel injected from the fuel injection valve of the internal combustion engine.

The method for calculating the volume V of spray will now be described with reference to FIG. 2. As shown in FIG. 2, the spray of fuel injected from the fuel injection valve 26 into the cylinder 11 is hypothetically conical. In this case, the volume V of spray can be calculated using a known Hiroyasu's equation. The following relational equations (3) and (4) are used to calculate a spray penetration S. The relational equation (3) is used when a fuel injection time t is less than a split time tc. The relational equation (4) is used when the fuel injection time t is greater than or equal to the split time tc. The split time tc is the time for the fuel injected from the fuel injection valve 26 to transition from liquid to gas.

In the relational equations (3) and (4), ΔP is the difference between the common rail pressure Pcr and the in-cylinder pressure Pcy. The in-cylinder pressure Pcy can be estimated based on the amount of air filling the cylinder 11 and the position of the piston in the cylinder 11. When the cylinder 11 is provided with a sensor that detects the pressure in the cylinder 11, the detection value of the sensor may be employed as the in-cylinder pressure Pcy. Further, in the relational equations (3) and (4), ρf is a fuel density, ρa is an air density, and d0 is the diameter of an injection hole of the fuel injection valve 26.

$$S = 0.39 \cdot \sqrt{2 \cdot \frac{\Delta P}{\rho f}} \cdot t \qquad (3)$$

$$S = 2.95 \cdot \left(\frac{\Delta P}{\rho a}\right)^{0.35} \cdot \sqrt{d0 \cdot t} \qquad (4)$$

The following relational equation (5) is used to calculate a spray angle θ. In the relational equation (5), μa is the viscosity coefficient of air that has been set in advance.

$$\theta = 0.05 \cdot \left(\frac{\rho a \cdot \Delta P \cdot d0}{\mu a^2}\right) \qquad (5)$$

The following relational equation (6) is used to calculate the volume V of spray.

$$V = \tfrac{1}{3} \cdot \pi \cdot \tan \theta^2 \cdot s^3 \qquad (6)$$

The oxygen concentration Cox is calculated based on the amount of air introduced into the cylinder 11 and the amount of EGR gas introduced into the cylinder 11. For example, the intake air amount GA, which is detected by the air flow meter 103, can be used as the amount of air introduced into the cylinder 11. The proportion of oxygen in the air is larger than the proportion of oxygen in EGR gas. Thus, the oxygen concentration Cox is calculated such that the oxygen concentration Cox decreases as the amount of EGR gas recirculating in the intake passage 21 through the EGR device 40 increases.

When the valve open degree of the EGR flow rate adjustment device 42 and the flow rate of exhaust gas in the exhaust passage 36 are kept to be fixed, the recirculation amount of EGR gas recirculating in the intake passage 21 through the EGR device 40 can be calculated based on the flow rate of exhaust gas in the exhaust passage 36 and the valve open degree of the EGR flow rate adjustment device 42. The flow rate of exhaust gas is a value corresponding to the intake air amount GA and the engine rotation speed NE.

When at least one of the valve open degree of the EGR flow rate adjustment device 42 and the flow rate of exhaust gas changes, a response delay from the change occurs in a change in the recirculation amount of EGR gas. In the present embodiment, when at least one of the valve open degree and the flow rate of exhaust gas changes, a map is used to estimate to what degree the change in the recirculation amount is delayed. Thus, when at least one of the valve open degree and the flow rate of exhaust gas changes, the map is used to estimate the recirculation amount.

The oxygen partial pressure O2 in the cylinder 11 in the relational equation (1) is calculated as the product of the oxygen concentration Cox and the in-cylinder pressure Pcy in the cylinder 11.

Further, the temperature T in the cylinder 11 when the main injection starts can be estimated based on the intake temperature Thim and the water temperature Thw. When the cylinder 11 is provided with a sensor that detects the temperature in the cylinder 11, the detection value of the sensor may be employed as the temperature T in the cylinder 11.

As described above, Pfuel, O2, and T in the relational equation (1) vary depending on the temperature of air flowing through the intake passage 21, the pressure of air flowing through the intake passage 21, the recirculation amount of EGR gas, and the water temperature Thw. Thus, the fuel partial pressure Pfuel, the oxygen partial pressure O2, and the temperature T in the cylinder 11 are also examples of parameters that vary the ignitability of fuel in the cylinder 11. Additionally, the index τ0, which is calculated using the above-described equation (1), is a value based on the parameters that vary the ignitability of fuel in the cylinder 11.

The target calculation unit 63 is configured to estimate the ignitability of fuel in the cylinder 11 based on the index τ0, which is calculated by the index calculation unit 62. The target calculation unit 63 calculates the ignition delay target value τtrg such that the ignition delay target value τtrg decreases as the ignitability estimated based on the index τ0 increases. In the present embodiment, the following relational equation (7) is used to calculate the ignition delay target value τtrg. Thus, the ignition delay target value τtrg can be increased monotonically relative to an increase in the index τ0. That is, the ignition delay target value τtrg can be decreased monotonically relative to an increase in the ignitability estimated based on the index τ0. F11 and F12 in the relational equation (7) are constants that have been set based on experiments and simulations. For example, the constant F11 is a positive value.

$$\tau trg = F11 \cdot \tau 0 + F12 \qquad (7)$$

The flow of processes of fuel injection during the engine operation in the region where the diffusion combustion and the premixed combustion are both performed will now be described with reference to FIG. 3.

Figure 6:
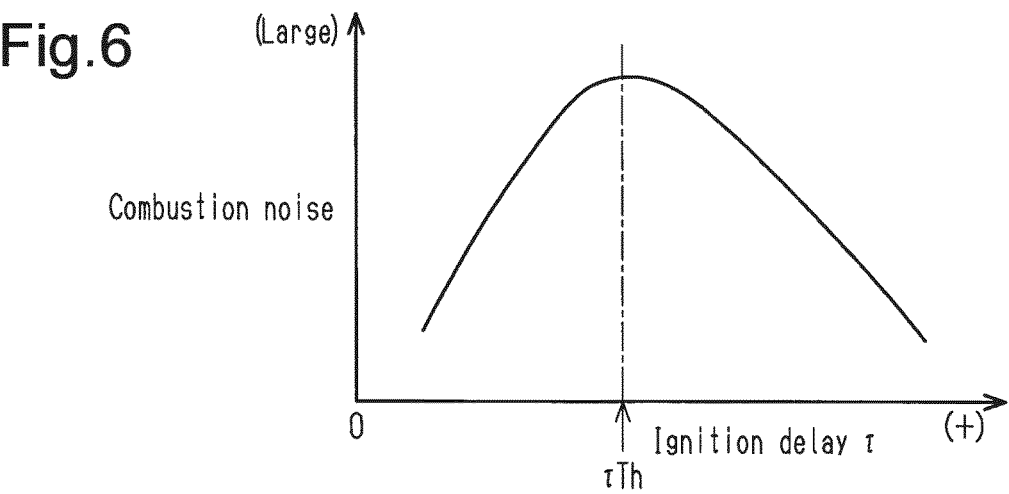
FIG. 6 is a graph showing the relationship between an ignition delay of fuel in the cylinder and the level of combustion noise.

Prior to the flow of processes shown in FIG. 3, description will be made on the method for estimating whether the engine operation is performed in the region where the diffusion combustion and the premixed combustion are both performed. In the present embodiment, the estimation is performed based on the ignition delay of fuel injected into the cylinder 11 through the main injection. For example, as shown in FIG. 6, when the ignition delay τ, which is an estimated value of the ignition delay of fuel injected into the cylinder 11 through the main injection, is less than a given time τTh, it can be estimated that the engine operation is performed in the region where the diffusion combustion and the premixed combustion are both performed. By contrast, when the ignition delay τ is greater than or equal to the given time τTh, it can be estimated that the engine operation is performed in a region where only the premixed combustion is performed, not in the region where the diffusion combustion and the premixed combustion are both performed. Thus, since it can be estimated that the engine operation is performed in the region where the diffusion combustion and the premixed combustion are both performed when the ignition delay τ is less than the given time τTh, a series of processes shown in FIG. 3 is executed.

The ignition delay τ can be calculated based on, for example, the boost pressure BP, the intake air amount GA, the water temperature Thw, the intake temperature Thim, the start point in time of the main injection, and the fuel injection amount of the main injection.

Figure 3:
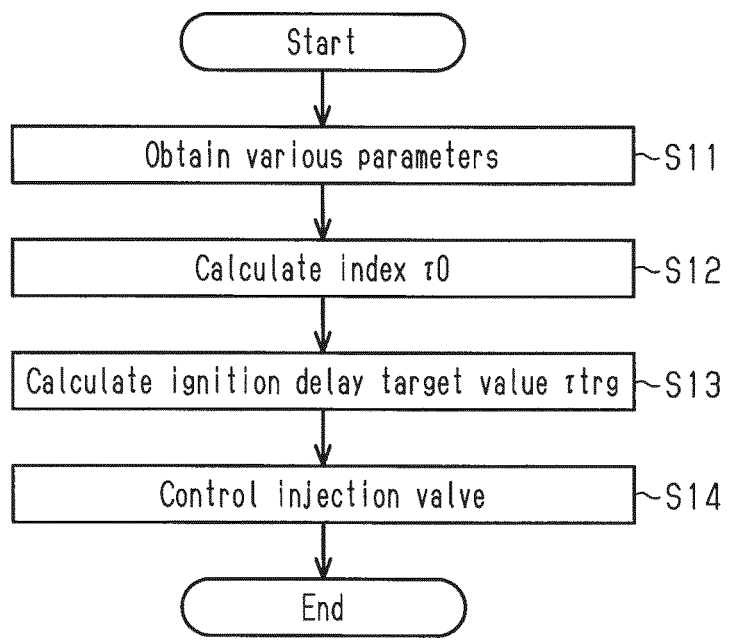
FIG. 3 is a flowchart illustrating a procedure for driving the fuel injection valve.

As shown in FIG. 3, various types of parameters for calculating the index τ0 are obtained in step S11. Next, in step S12, the index calculation unit 62 calculates the index τ0 using the above-described equation (1). Subsequently, in step S13, the target calculation unit 63 calculates the ignition delay target value τtrg using the above-described relational equation (7).

Then, in step S14, the valve control unit 61 controls the driving of the fuel injection valve 26 such that the ignition delay τ becomes the ignition delay target value τtrg. In the present embodiment, in step S14, the valve control unit 61 adjusts the fuel injection amount of the pilot injection executed prior to the main injection, that is, the time of energizing the fuel injection valve 26 during the pilot injection. For example, when the ignition delay τ is shorter than the ignition delay target value τtrg, the valve control unit 61 decreases the fuel injection amount of the pilot injection. By contrast, when the ignition delay τ is longer than the ignition delay target value τtrg, the valve control unit 61 increases the fuel injection amount of the pilot injection. The series of processes is then ended.

The operation and advantages of the present embodiment will now be described with reference to FIGS. 4 to 7.

Figure 4:
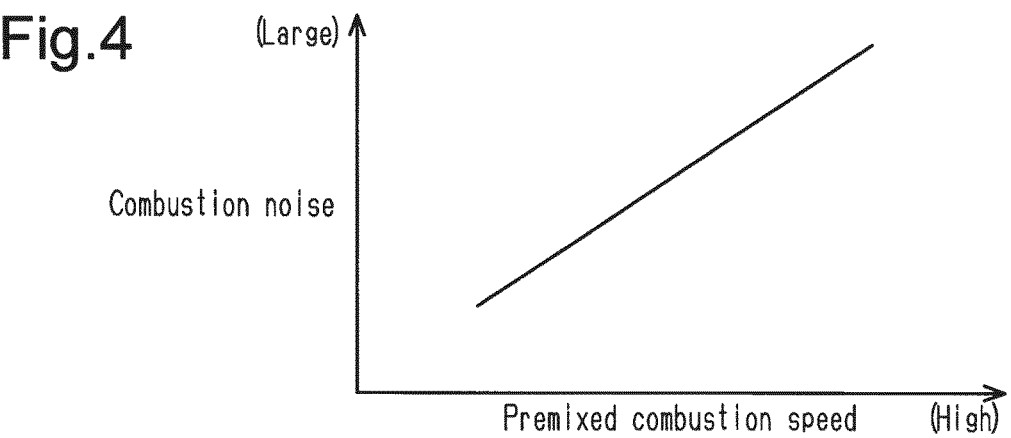
FIG. 4 is a graph showing the relationship between a premixed combustion speed and the level of combustion noise.

FIG. 4 shows the relationship between a premixed combustion speed and the level of combustion noise, which is the noise resulting from the combustion of fuel in the cylinder 11. As shown in FIG. 4, the combustion noise increases as the premixed combustion speed increases. This is because flame spreads at once in the cylinder 11 as the premixed combustion speed increases. As the speed of flame spreading in the cylinder 11 increases, the combustion noise tends to increase.

Figure 5:
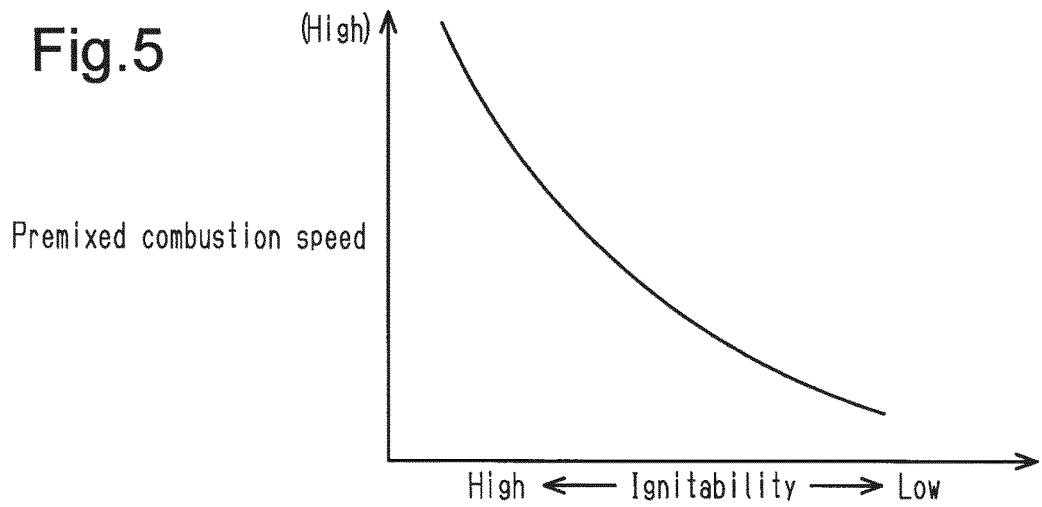
FIG. 5 is a graph showing the relationship between the ignitability of fuel in the cylinder and the premixed combustion speed.

FIG. 5 shows the relationship between the ignitability of fuel injected into the cylinder 11 and the premixed combustion speed. The graph shown in FIG. 5 is the result obtained through experiments and simulations. The graph of FIG. 5 reveals that the premixed combustion speed decreases as the ignitability of fuel in the cylinder 11 decreases. That is, as the index τ0 increases, the premixed combustion speed decreases.

FIG. 6 is a graph showing the relationship between the ignition delay τ and the level of combustion noise. Referring to FIG. 6, when the ignition delay τ is less than the given time τTh in the cylinder 11, the diffusion combustion and the premixed combustion are both performed. By contrast, when the ignition delay τ is greater than or equal to the given time τTh, only the premixed combustion is performed in the cylinder 11. The graph of FIG. 6 reveals that the combustion noise increases as the ignition delay τ increases during the engine operation in the region where the diffusion combustion and the premixed combustion are both performed. This is because during the engine operation in the region where the diffusion combustion and the premixed combustion are both performed, the proportion of the premixed combustion in the diffusion combustion and the premixed combustion increases as the ignition delay of fuel in the cylinder increases, thereby increasing the combustion noise. More specifically, as the ignitability of fuel in the cylinder 11 decreases, the ignition delay of fuel in the cylinder tends to increase. Further, as the ignitability of fuel in the cylinder 11 decreases, the premixed combustion speed tends to decrease. In addition, as the premixed combustion speed decreases, the proportion of the premixed combustion in the diffusion combustion and the premixed combustion tends to increase. Thus, since the premixed combustion speed decreases as the ignition delay increases, the proportion of the premixed combustion in the diffusion combustion and the premixed combustion increases. This increases the combustion noise.

The relationship between the combustion noise and the ignition delay τ during the engine operation in the region where the diffusion combustion and the premixed combustion are both performed can be represented by the following approximate equation (8). In equation (8), P1, P2, and P3 are constants.

$$\text{Combustion Noise} \propto P1 \cdot \tau^{P2} + P3 \quad (8)$$

As described above, the index τ0 is inversely proportional to the premixed combustion speed. Thus, the relationship between the combustion noise and the ignition delay τ can be represented as shown by the above-described equation (8). Accordingly, the relationship between the combustion noise, the ignition delay τ, and the index τ0 can be represented as shown by the following equation (9).

$$\text{Combustion Noise} \propto (P1 \cdot \tau^{P2} + P3)/\tau 0 \quad (9)$$

When the combustion noise is a fixed value Const, equation (9) can be represented as equation (10). In a case in which the ignition delay τ when the combustion noise is the fixed value Const is the ignition delay target value τtrg, the ignition delay target value τtrg can be represented by the following equation (11).

$$Const = (P1 \cdot \tau^{P2} + P3)/\tau 0 \quad (10)$$

$$\tau trg = \left(\frac{Const \cdot \tau 0 - P3}{P1}\right)^{\frac{1}{P2}} \quad (11)$$

As obvious from equation (11), the level of combustion noise can be kept at a fixed value by increasing the ignition delay target value τtrg as the index τ0 increases. Further, the above-described relational equation (7) can be obtained by setting the constant P2 in equation (11) to one.

Figure 7:
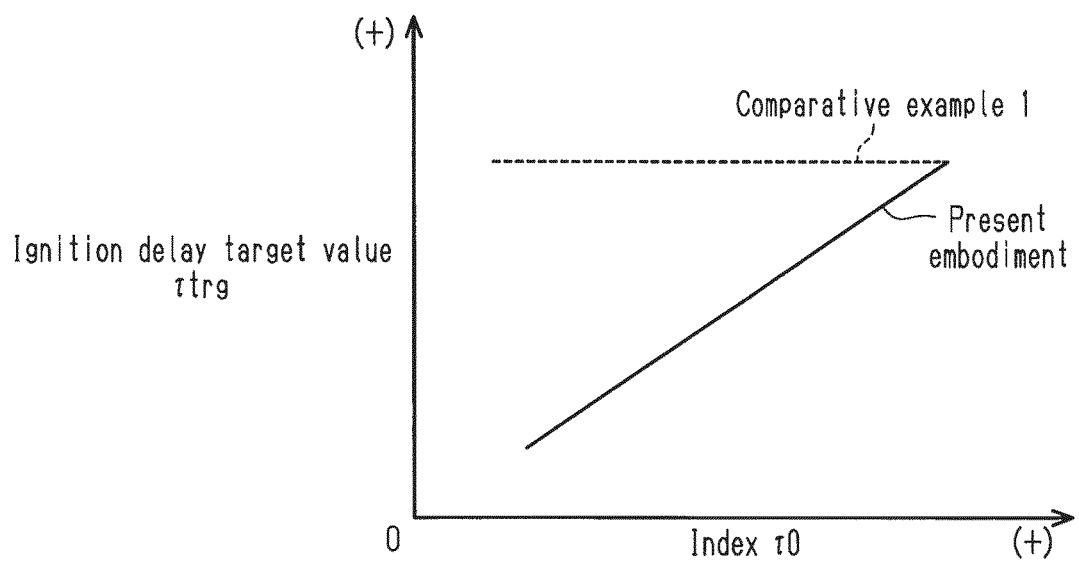
FIG. 7 is a graph showing the relationship between an index of the ignitability of fuel and an ignition delay target value.

In the present embodiment, the relational equation (7) obtained in this manner is used to calculate the ignition delay target value τtrg. The solid line shown in FIG. 7 represents the relationship between the index τ0 and the ignition delay target value τtrg calculated using the relational equation (7). The broken line shown in FIG. 7 represents the ignitability of fuel, that is, comparative example 1, in which the ignition delay target value τtrg is set regardless of the index τ0.

In comparative example 1, when the operating state of the internal combustion engine 10 is fixed, that is, when the engine rotation speed NE and an engine load ratio KL are fixed, the ignition delay target value τtrg remains unchanged even if the parameters varying the ignitability of fuel (i.e., index τ0 of ignitability) change. As a result, when the parameters change, the level of combustion noise varies.

In the present embodiment, the ignitability of fuel is estimated based on the index τ0. Further, the ignition delay target value τtrg is calculated such that the ignition delay target value τtrg decreases as the ignitability increases. Then, the fuel injection valve 26 is controlled such that the ignition delay τ of fuel injected into the cylinder 11 through the main injection is approximated to the ignition delay target value τtrg. That is, the fuel injection valve 26 is controlled such that the deviation decreases between the ignition delay τ of fuel injected into the cylinder 11 through the main injection and the ignition delay target value τtrg. This reduces variation in the level of combustion noise that is caused when the above-described parameters vary.

Accordingly, in the present embodiment, the variation in the level of combustion noise during the engine operation in the region where the diffusion combustion and the premixed combustion are both performed is limited.

The above-described embodiment may be modified as follows. The above-described embodiments and the following modifications can be combined as long as the combined modifications remain technically consistent with each other.

The ignition delay τ of fuel injected into the cylinder 11 through the main injection changes depending on the start point in time of the pilot injection. More specifically, the ignition delay of fuel injected into the cylinder 11 through the main injection can be lengthened by retarding the start point in time of the pilot injection and narrowing the interval between the point in time of the pilot injection and the point in time of the main injection. Thus, the point in time of the pilot injection may be retarded when the ignition delay τ is shorter than the ignition delay target value τtrg, and the point in time of the pilot injection may be advanced when the ignition delay τ is longer than the ignition delay target value τtrg.

When the ignition delay τ of fuel injected into the cylinder 11 through the main injection is different from the ignition delay target value τtrg, the fuel injection amount of the pilot injection and the start point in time of the pilot injection may be both adjusted.

The divergence between the ignition delay τ of fuel injected into the cylinder 11 through the main injection and the ignition delay target value τtrg may be decreased by changing the start point in time of the main injection. In this case, adjustment of the fuel injection amount of the pilot injection and adjustment of the start point in time of the pilot injection to decrease the divergence between the ignition delay τ and the ignition delay target value τtrg may be omitted.

In the above-described embodiment, the ignition delay target value τtrg is calculated using the above-described relational equation (7), which is a linear function. However, as long as the ignition delay target value τtrg can be decreased monotonically relative to a decrease in the index τ0, an equation that differs from the above-described relational equation (7) may be used to calculate the ignition delay target value τtrg. For example, a quadratic function such as the following relational equation (12) may be used to calculate the ignition delay target value τtrg. In the relational equation (12), F21, F22, and F23 are constants that have been set based on experiments and simulations. The relational equation (12) can be obtained by setting the constant P2 in the above-described equation (11) to 0.5.

$$\tau trg = F21 \cdot \tau 0^2 + F22 \cdot \tau 0 + F23 \quad (12)$$

Figure 8:
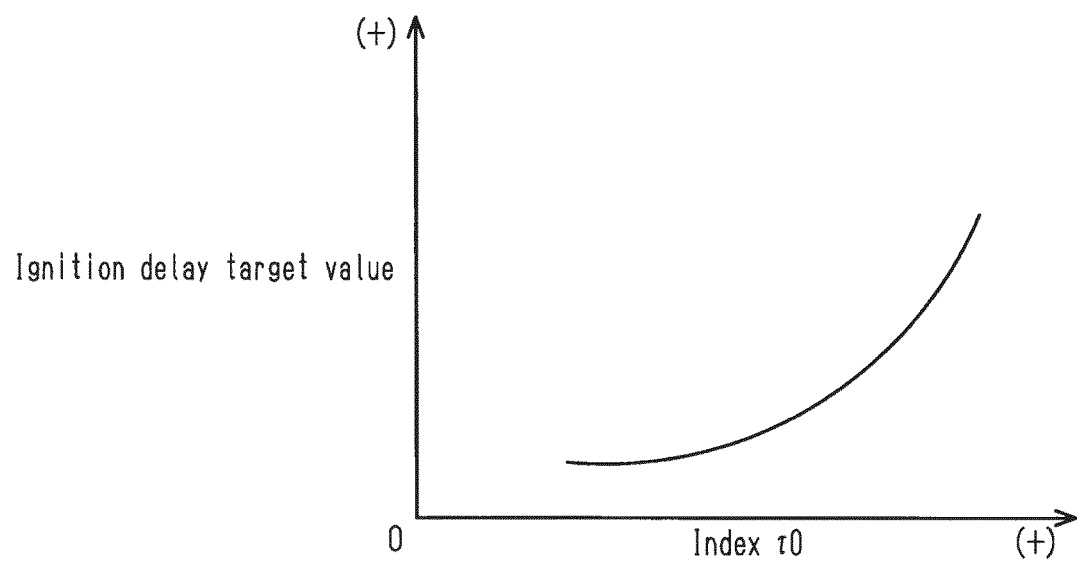
FIG. 8 is a graph showing the relationship between an index of the ignitability of fuel and an ignition delay target value in a modification.

When the ignition delay target value τtrg is calculated using the relational equation (9), the ignition delay target value τtrg changes relative to changes in the index τ0 as shown in FIG. 8.

The function M(T) in the Arrhenius equation (1) may be different from the above-described equation (2) as long as the value of the calculation result can be increased as the temperature T in the cylinder 11 increases.

In the above-described embodiment, the Arrhenius equation (1) is used to calculate the index τ0. However, as long as the index τ0 can be set to a value corresponding to the ignitability of fuel in the cylinder 11, equation (1) does not have to be used to calculate the index τ0.

For example, as long as the index τ0 can be decreased as the fuel partial pressure Pfuel in the cylinder 11 increases at the point in time at which the main injection ends, the index τ0 may be calculated without using equation (1).

Further, as long as the index τ0 can be decreased as the oxygen partial pressure O2 in the cylinder 11 increases at the point in time at which the main injection ends, the index τ0 may be calculated without using equation (1).

In addition, as long as the index τ0 can be decreased as the temperature T in the cylinder 11 increases at the point in time at which the main injection starts, the index τ0 may be calculated without using equation (1).

Instead of estimating the ignitability of fuel based on the index τ0, the ignitability may be directly estimated from the parameters that vary the ignitability of fuel in the cylinder 11. For example, the ignitability may be estimated based on the fuel partial pressure Pfuel in the cylinder 11 at the point in time at which the main injection ends. For example, the ignitability may be estimated based on the oxygen partial pressure O2 in the cylinder 11 at the point in time at which the main injection ends. Further, the ignitability may be estimated based on the temperature T in the cylinder 11 at the point in time at which the main injection starts.

The controller 60 is not limited to a device that includes a CPU and a memory and executes software processing. For example, at least part of the processes executed by the software in the above-described embodiment may be executed by hardware circuits dedicated to execution of these processes (such as ASIC). That is, the controller may be modified as long as it has any one of the following configurations (a) to (c). (a) A configuration including a processor that executes all of the above-described processes according to programs and a program storage device such as a ROM that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software processing circuits each including a processor and a program storage device and a plurality of dedicated hardware circuits may be provided. That is, the above processes may be executed in any manner as long as the processes are executed by processing circuitry that includes at least one of a set of one or more software processing circuits and a set of one or more dedicated hardware circuits.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A controller for an internal combustion engine, wherein the controller is configured to control a compression ignition internal combustion engine including a fuel injection valve that injects fuel into a cylinder and configured to cause the fuel injection valve to perform pilot injection and then perform main injection, the controller comprising:
   a valve control unit configured to control the fuel injection valve such that divergence decreases between an ignition delay of the fuel injected into the cylinder through the main injection and an ignition delay target value, the ignition delay target value being a target of the ignition delay; and
   a target calculation unit configured to calculate the ignition delay target value such that the ignition delay target value decreases as ignitability of the fuel in the cylinder increases during an engine operation in a region where diffusion combustion and premix combustion are both performed, the ignitability of the fuel in the cylinder being estimated based on a parameter that varies the ignitability.

2. The controller according to claim 1, wherein
the parameter includes a fuel partial pressure in the cylinder, and
the target calculation unit is configured to estimate the ignitability of the fuel in the cylinder such that the ignitability increases as the fuel partial pressure in the cylinder increases.

3. The controller according to claim 1, wherein
the parameter includes an oxygen partial pressure in the cylinder, and
the target calculation unit is configured to estimate the ignitability of the fuel in the cylinder such that the ignitability increases as the oxygen partial pressure in the cylinder increases.

4. The controller according to claim 1, wherein
the parameter includes a temperature in the cylinder, and
the target calculation unit is configured to estimate the ignitability of the fuel in the cylinder such that the ignitability increases as the temperature in the cylinder increases.

5. The controller according to claim 1, wherein
the parameter includes a fuel partial pressure in the cylinder, an oxygen partial pressure in the cylinder, and a temperature in the cylinder,
the controller comprises an index calculation unit configured to calculate an index of the ignitability of the fuel based on the fuel partial pressure in the cylinder, the oxygen partial pressure in the cylinder, and the temperature in the cylinder,
the target calculation unit is configured to calculate the ignition delay target value based on the index calculated by the index calculation unit, and
the index calculation unit is configured to calculate the index using equation (i), wherein equation (i) is $$\tau 0 = \frac{1}{A \cdot [Pfuel]^B \cdot [O2]^C \cdot M(T)}$$

where $\tau 0$ is the index, Pfuel is the fuel partial pressure in the cylinder, O2 is the oxygen partial pressure in the cylinder, T is the temperature in the cylinder, M(T) is a function that includes the temperature in the cylinder as a variable, and A, B, and C are model constants.

6. The controller according to claim 1, wherein the valve control unit is configured to approximate the ignition delay to the ignition delay target value by adjusting at least one of a fuel injection amount of the pilot injection and a start point in time of the pilot injection.

7. A method for controlling an internal combustion engine, wherein the controller controls a compression ignition internal combustion engine including a fuel injection valve that injects fuel into a cylinder, the method comprising:
performing pilot injection with the fuel injection valve;
performing main injection after the pilot injection;
controlling the fuel injection valve such that divergence decreases between an ignition delay of the fuel injected into the cylinder through the main injection and an ignition delay target value, the ignition delay target value being a target of the ignition delay; and
calculating the ignition delay target value such that the ignition delay target value decreases as ignitability of the fuel in the cylinder increases during an engine operation in a region where diffusion combustion and premix combustion are both performed, the ignitability of the fuel in the cylinder being estimated based on a parameter that varies the ignitability.

8. A controller for an internal combustion engine, wherein the controller is configured to control a compression ignition internal combustion engine including a fuel injection valve that injects fuel into a cylinder and configured to cause the fuel injection valve to perform pilot injection and then perform main injection, the controller comprising processing circuitry configured to perform:
a process for controlling the fuel injection valve such that divergence decreases between an ignition delay of the fuel injected into the cylinder through the main injection and an ignition delay target value, the ignition delay target value being a target of the ignition delay; and
a process for calculating the ignition delay target value such that the ignition delay target value decreases as ignitability of the fuel in the cylinder increases during an engine operation in a region where diffusion combustion and premix combustion are both performed, the ignitability of the fuel in the cylinder being estimated based on a parameter that varies the ignitability.

* * * * *